(12) United States Patent
Kammel

(10) Patent No.: US 7,886,522 B2
(45) Date of Patent: Feb. 15, 2011

(54) DIESEL GAS TURBINE SYSTEM AND RELATED METHODS

(76) Inventor: Refaat Kammel, 7165 Clinton Rd., Jackson, MI (US) 49201

( * ) Notice: Subject to any disclaimer, the term of this patent is extended or adjusted under 35 U.S.C. 154(b) by 712 days.

(21) Appl. No.: 11/758,654

(22) Filed: Jun. 5, 2007

(65) Prior Publication Data
US 2007/0277514 A1 Dec. 6, 2007

Related U.S. Application Data

(60) Provisional application No. 60/810,902, filed on Jun. 5, 2006.

(51) Int. Cl.
*F01N 5/04* (2006.01)
*F01N 3/10* (2006.01)
*F02B 33/44* (2006.01)
*F02G 3/00* (2006.01)
*B60K 6/20* (2007.10)
*B60W 20/00* (2006.01)

(52) U.S. Cl. .............................. 60/280; 60/299; 60/301; 60/607; 60/624; 180/65.21; 180/65.28; 903/905; 903/907

(58) Field of Classification Search .................. 60/280, 60/597, 607, 608, 609, 614, 624, 299, 289, 60/293, 301; 180/65.26, 65.21, 65.28, 65.285, 180/65.29; 903/905, 907
See application file for complete search history.

(56) References Cited

U.S. PATENT DOCUMENTS 5,000,003 A * 3/1991 Wicks .......................... 60/618
2005/0097888 A1 * 5/2005 Miyashita .................... 60/602
2006/0063046 A1 * 3/2006 Hu et al. ....................... 429/17
2006/0112928 A1 * 6/2006 Coleman et al. ............ 123/305

FOREIGN PATENT DOCUMENTS

JP 60178921 A * 9/1985
WO WO 2005088086 A1 * 9/2005

OTHER PUBLICATIONS

Emissions Standards, Jun. 28, 2005, U.S. Department of Transportation Federal Highway Administration, pp. 1-3.*

* cited by examiner

*Primary Examiner*—Thomas E Denion
*Assistant Examiner*—Audrey Klasterka
(74) *Attorney, Agent, or Firm*—Harness, Dickey & Pierce, P.L.C.

(57) ABSTRACT

A combined diesel gas-turbine system for optimizing operation and combustion processes of a diesel engine includes a catalytic sub-system, a turbo-generator sub-system and a hybrid sub-system. The catalytic sub-system is in communication with an exhaust port of the diesel engine and is operative for combusting and reducing all pollutants from diesel exhaust. The catalytic sub-system is a three-way catalytic converter and a first catalytic converter in series with a second catalytic converter. The turbo-generator sub-system is operative for the reclamation of secondary energy from the catalytic sub-system and includes a turbine in communication with the second catalytic converter for receiving a source of cleaned exhaust gas to drive the turbine. The hybrid sub-system is operative for the management of energy within the system. The system may incorporate a waste heat recovery system and convert it to mechanical power. The system may include a steam generator for the recovery of waste heat from the post turbo-charger exhaust. The combined diesel gas-turbine system is capable of reducing all diesel engine pollutants to near-zero levels and increase thermal efficiency.

12 Claims, 2 Drawing Sheets

DIESEL GAS TURBINE SYSTEM AND RELATED METHODS

CROSS-REFERENCE TO RELATED APPLICATIONS

This application claims priority to U.S. Provisional Patent Application No. 60/810,902 filed 5 Jun. 2006, which application is herein expressly incorporated by reference.

FIELD

The present teachings generally relate to diesel engine design and after-treatment. More particularly, the present teachings concern a diesel gas-turbine system for optimizing operation and combustion process of a diesel engine and a related method for ultra clean emission and high thermal efficiency.

BACKGROUND

The diesel engine continues to be a significant source for mechanical power generation for both mobile and stationary applications. Diesel engines generally enjoy a relatively high thermal efficiency and good reliability and durability in operation. However, diesel engines are associated with high levels of pollutants such as nitrogen oxides, particulate matters, toxicity and high levels of nano-particles. Government regulations in the United States and other countries are tightening emission regulations for diesel engine applications. The clean-up of diesel exhaust to the highest level is a primary goal of the regulatory agencies, manufacturers and end users. While recent advances have been appreciated, such advances are typically associated with significant loss in fuel economy, increased capital costs and high emissions.

In view of the foregoing, a continuous need for improvement in the pertinent art exists.

SUMMARY

The present teachings are generally based on operation of a diesel combustion process close to stoichiometric conditions. Several applications of the present teachings are currently anticipated. Of particular interest is the "Premixed Charge Compression Ignition" (PCCI). In a PCCI process, NOx may be reduced significantly by an order of 90 to 95%. However, due to the nature of such process, the level of CO, HC, and PM increases exponentially. In addition, fuel economy may take a severe penalty in the order of 15 to 20%. Such drawbacks render the PCCI and similar processes unattractive or impractical for implementation. The PCCI cycle can be achieved through excessive EGR injection or through increased fuel/air ratio, reducing $O_2$ levels in the exhaust to an order of approximately 1 to 2%.

The present teachings manage the stated drawbacks in a satisfactory matter, so that all increased pollutants are destroyed and fuel economy is significantly improved and enhanced. The present teachings incorporate two separate catalysts immediately after the engine exhaust manifold and ahead of the turbocharger. Air is injected ahead of the second catalyst. The function of the first catalyst is to burn HC, CO, VOC and $H_2$ and reduce NOx in the exhaust to the extent possible until all remaining oxygen in the exhaust is depleted. This will dissociate the remaining NOx to elemental $O_2$ and $N_2$, and thereby substantially reduce NOx to near-zero level. The second catalyst will destroy all remaining HC, CO, VOC with assistance from a small amount of injected air. The exhaust temperatures in the catalysts may be in the order of 1200 to 1400° F. and can increase to 1600 to 1700° F., highly effective for catalytic activities. As a result, the exhaust is cleansed of all pollutants to near-zero level. The internal energy of the exhaust gases increases as a result of the secondary combustion in the catalysts.

According to one particular aspect, the present teachings provide a combined diesel gas-turbine system. In addition to the engine turbo-charger, an additional turbo-generator is added to recover the released energy from catalysts combustion. Where system operation demands continuously varying load, a hybrid system, in the form of electrical or hybrid, can be employed to respond to continuous and variable load demands.

According to another particular aspect, the present teachings provide a combined diesel gas-turbine system for optimizing the operation and combustion process of a diesel engine. The diesel engine has a variable valve train system and controls to operate at rich/near stoichiometric conditions and at steady state. The system includes a catalytic sub-system, a turbo-charger/turbo-generator sub-system and a hybrid sub-system. The catalytic sub-system is in communication with an exhaust port of the diesel engine and is operative for combusting diesel exhaust unburned gases. The catalytic sub-system includes a three-way catalytic converter and a first catalytic converter in series with a second catalytic converter. The turbo-generator sub-system is operative for the reclamation of secondary energy from the catalytic sub-system. The hybrid sub-system is operative for the management of energy output and demand within the system. The hybrid sub-system is mechanically coupled to the diesel engine to receive mechanical power from the diesel engine and is electrically coupled, in the case of hybrid electric system, to the generator through a motor/generator.

According to yet another particular aspect, the present teachings provide a method for optimizing the operation and combustion processes of a diesel engine with a combined diesel gas-turbine system. The method includes combusting unburned gases in the exhaust gases from the diesel engine with a three-way catalytic sub-system, including a first catalytic converter in series with a second catalytic converter. Turbo-charged air is delivered from the turbo-charger to an intake of the diesel engine. Energy is managed within the system by a hybrid sub-system. The hybrid sub-system is mechanically coupled to the diesel engine to receive mechanical power from the diesel engine and is electrically coupled to the generator through a motor/generator.

Further areas of applicability of the present teachings will become apparent from the description and appended claims provided hereinafter. It should be understood that the detailed description and specific examples, while indicating the various examples of the present teachings, are intended for purposes of illustration only and are not intended to limit the scope of the teachings.

DRAWINGS

The present teachings will become more fully understood from the detailed description, the appended claims and the following drawings.

DESCRIPTION OF VARIOUS ASPECTS

Figure 1:
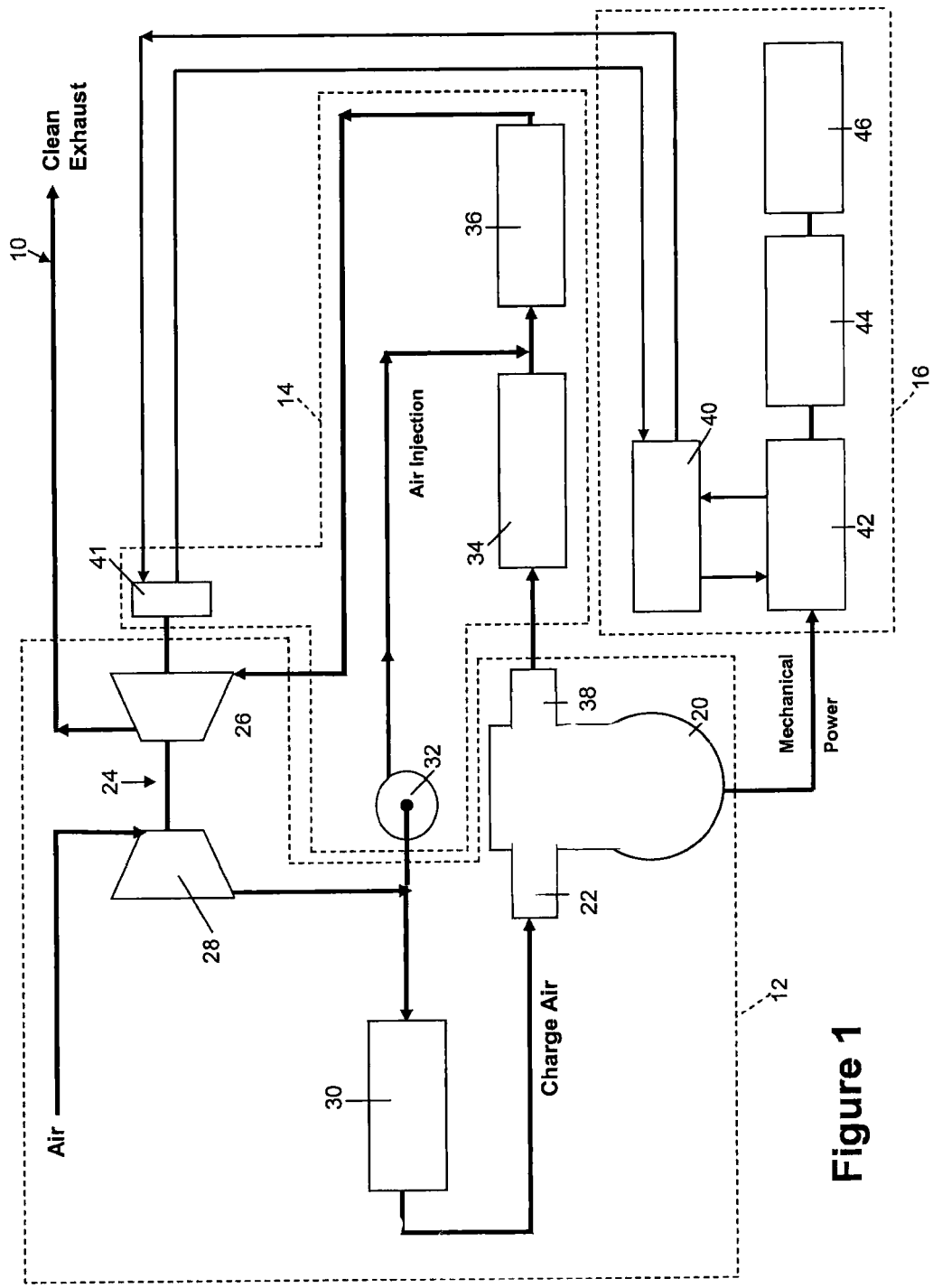
FIG. 1 is a schematic diagram illustrating a diesel engine and gas turbine system in accordance with the present teachings.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

With general reference to the schematic view of FIG. 1, a diesel engine and gas turbine system in accordance with the present teachings is illustrated and generally identified at reference character 10. As will become more fully appreciated below, the present teachings are intended to optimize the operating and combustion processes of a diesel engine 20. Insofar as the present teachings are concerned, it will be understood that the diesel engine 20 may be substantially conventional in both operation and construction. The diesel engine 20 may be used for mobile applications, including but not limited to motor vehicle applications, and may be for stationary applications.

For purposes of effective operation, the diesel engine 20 must operate in a plurality of steady-state engine operating modes. The diesel engine may include a variable valve train system (not particularly shown). In such an arrangement, the diesel engine 20 includes intake and exhaust valve systems that are cam-less and are activated electronically. The valve systems may allow for the use of an even number of cylinders of the diesel engine 20 at a particular time dependent a load demand. The cylinder power cycle may be maintained in a steady state and optimized for various load demands. As a result, the exhaust temperature is steadily maintained, but exhaust flow changes in incremental steps corresponding to the number of operating cylinders.

The system 10 of the present teachings may be described with reference to various subsystems. These subsystems may include a turbo-charger and generator sub-system 12, a catalytic sub-system 14 and a hybrid electric sub-system 16. The turbo-charger sub-system 12 may be generally operative for delivering a source of turbo-charged air to an intake 22 of the diesel engine 20. The catalytic sub-system 14 may be generally operative for combusting diesel exhaust pollutants. The hybrid electric sub-system 16 may be generally operative for managing energy of the system throughout various operating conditions.

Turbo-Charger/Generator Subsystem

The turbo-charger sub-system 12 may include a turbo-charger 24. The turbo-charger 24, may include a turbine 26 and a compressor 28. As will be addressed further below, the turbine 26 may be driven by exhaust gasses of the diesel engine 20. The turbine 26 may, in turn, drive the compressor 28 for providing a source of charged air to the intake 22 of the diesel engine 20. The turbo-charger generator sub-system 12 may additionally include a charged air cooler 30. The charged air cooler 30 may operate to cool the engine intake air after it passes through the turbo-charger 24 to an optimum temperature for efficient engine operation. A boost blower 32 may be utilized in conjunction with the charged air cooler 30 for air injection.

Catalytic Sub-system

The Catalytic Sub-system 14 may include a three-way catalytic converter for the reduction of nitrogen oxides ($NO_x$) to nitrogen ($N_2$) and oxygen ($O_2$); the oxidation of carbon monoxide (CO) to carbon dioxide ($CO_2$); and the oxidation of hydrocarbons (HC) to carbon dioxide and water; and the incineration of the particulate matters (PM) to $Co_2$ and $H_2O$. The subsystem 14 may complete combustion of the remaining unburned gases from the diesel engine resulting in an increase in the internal energy of the exhaust gases. Such system efficiency is dependant on exhaust temperatures, which are very high. As oxygen is virtually eliminated from the exhaust, remaining NOx is disassociated into elemental oxygen and nitrogen, leading to virtual removal of NOx from the exhaust.

The catalytic sub-system 14 may include a first catalytic converter 34 and a second catalytic converter 36. The first and second catalytic converters 34 and 36 may be in series for the sequential combustion and elimination of pollutants from the diesel engine exhaust gasses in most effective way to accommodate slight variations in air/fuel ratios. The first catalytic converter 34 may be in communication with an exhaust port 38 of the diesel engine 20 and in communication with an intake of the second catalytic converter 36.

The first catalytic converter 34 may operate to provide primary combustion of the exhaust gases. In this regard, the first catalytic converter 34 may operate to reduce particulate matter (PM), HC, and CO. The first catalytic converter 34 may further be operated to substantially eliminate NOx to near-zero levels through high temperatures catalytic activities and sufficient residence time. At the high exhaust temperatures typically encountered in this mode of operation, which are maintained steady in the order of 1200 to 1400° F. and sufficient residence time is adequate to burn PM, HC and CO. Residence time may be increased by increasing the length of the piping system and the piping diameter. Remaining NOx is dissociated in the first catalytic converted rapidly as $O_2$ is depleted and can be virtually eliminated once such condition is reached. This may require the exhaust gases to have excess unburned gases.

The second catalytic converter 38 may operate to provide secondary combustion of the remaining unburned gases from the first converter. The sub-system 16 may additionally utilize a source of air injection to introduce oxygen into the second catalytic converter 38. The air may be injected by the boost blower 32, for example. The air introduced by the boost blower 32 may be approximately 1 to 2 percent compared to a volume of the exhaust exiting the engine. The exhaust gases temperature increases in the second catalytic converter, despite air injection at lower temperature, due to the amount of air injected being small.

The second catalytic converter 38 may be in communication with the turbine 26 of the turbo-charger 24 for the recuperation of secondary combustion energy. In this regard, the second catalytic converter 38 delivers ultra clean exhaust gases to the turbine 26 to power the generator 41. The clean exhaust then is exhausted to atmosphere from the turbine 26.

In summary, the combination of catalytic converters, sufficient resident time and exhaust temperatures, are essential factors leading to the reduction of NOx, PM, HC, CO and VOC's to near-zero levels as well as an increase in the internal energy of the exhaust gases.

Hybrid Sub-system

The hybrid sub-system 16 may be electric or hydraulic. Hybrid-electric is shown in FIG. 1 and briefly has a bank of rechargeable batteries 40. The batteries 40 may be electrically coupled to the generator 41 of the turbocharger 26. The hybrid electric sub-system 16 may be mechanically coupled to the diesel engine 20 to receive mechanical energy from the diesel engine 20. The battery bank 40 may additionally be coupled to various components for the transfer of electrical energy therebetween. These additional components may include, but are not limited to, regenerative brakes 42, a transmission 44 and vehicle wheels and engine parricide loads (not shown). Of course, these particular components will vary depending on the particular application for the diesel engine 20. The hybrid electric sub-system 16 may be electronically controlled in an otherwise conventional manner for the distribution of power within the system 10.

Figure 2:
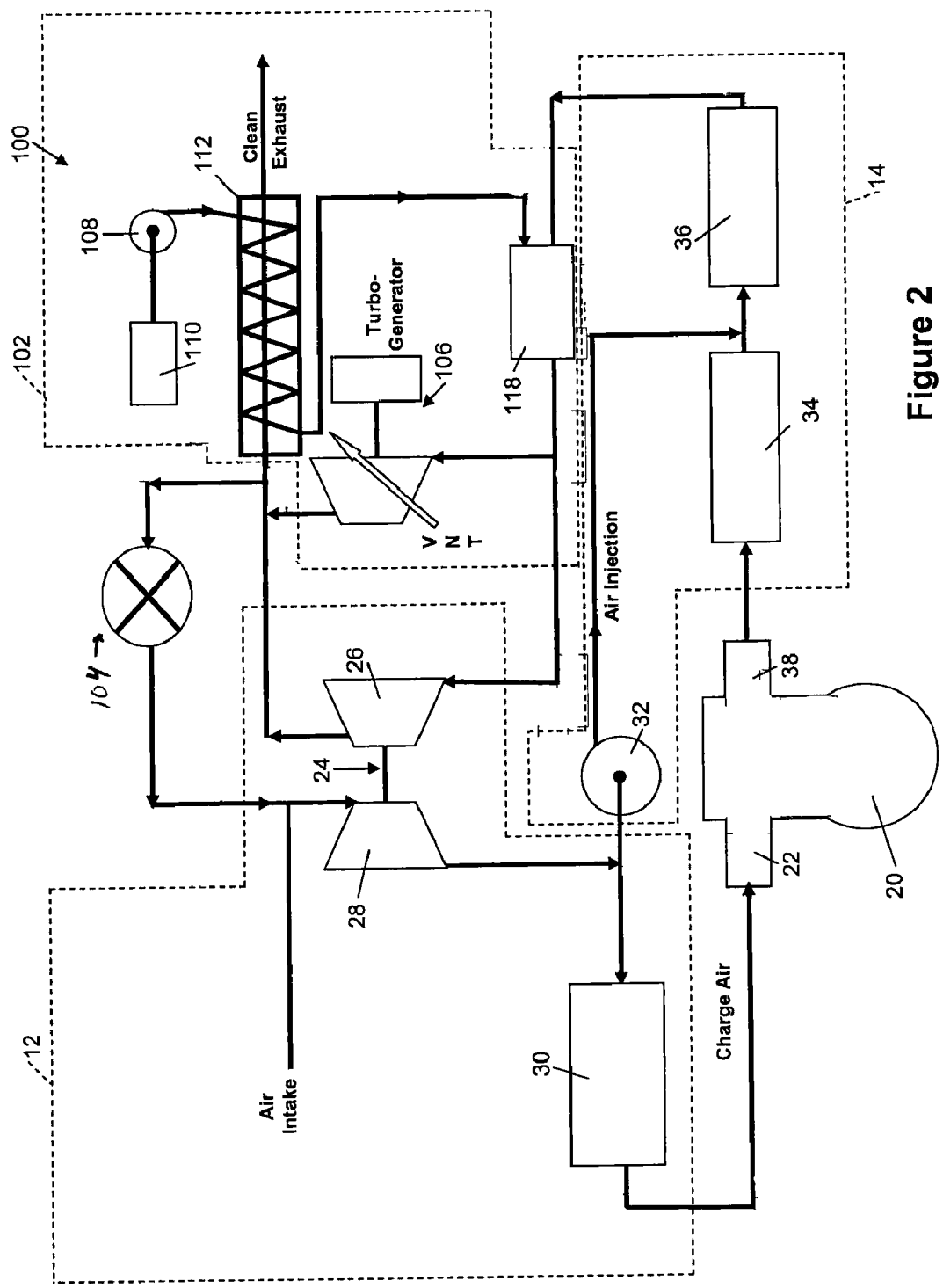
FIG. 2 is a schematic diagram illustrating another diesel engine and gas turbine system in accordance with the present teachings. The system incorporates a steam generation subsystem for waste heat energy recovery and an exhaust gas recirculation (EGR) system for near stoichometric operation of the diesel engine.

Turning now to the schematic diagram of FIG. 2, another diesel engine and gas turbine system in accordance with the present teachings is illustrated and generally identified at reference character 100. The system 100 may additionally include a steam generation sub-system 102 and an exhaust gas recirculation 104. The steam generation subsystem 102 may generally operate to recover waste heat energy from the exhaust down-stream from the gas turbine. Like reference characters are used in FIG. 2 to identify similar components and elements introduced above with respect to the system 10 of FIG. 1.

Steam Generation Sub-system

The steam generation sub-system 102 may reduce exhaust gas temperatures ahead of the turbo-charger 24 and significantly enhance the thermal efficiency of the diesel/turbo-generator 106 system. The sub-system 102 may include a water feed pump 108 to draw water from a water supply 110 and deliver the water to a steam generator 112. Water may be delivered by the pump 108 at a rate to match the exhaust flow of the diesel engine which is dependent on the number of operating cylinders. The steam generator 112 may reclaim energy from the waste heat and a low grade steam may be generated at temperatures approximately 350-700° F. This steam may be fed to a steam/exhaust mixer 118 and, as a result, injected in the exhaust ahead of the turbine 26. The steam increases the gas flow to the turbine, thus increasing mechanical energy output and resulting in a significant increase in the combined thermal efficiency. Injecting steam with hot exhaust gases may function to lower the temperatures of the mixture by a significant margin and thereby lower operating temperatures for the turbine 26. This option may be particularly attractive for large diesel engine applications, especially stationary ones.

As will be understood by those skilled in the art, the EGR 104 may be used to operate the engine 20 near stoichometric conditions. Other manners well known in the art may be alternatively employed to operate at such conditions.

While specific examples have been described in the specification and illustrated in the drawings, it will be understood by those skilled in the art that various changes may be made and equivalence may be substituted for elements thereof without departing from the scope of the present teachings as defined in the claims.

Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode presently contemplated for carrying out the present teachings but that the scope of the present disclosure will include any embodiments following within the foregoing description and the appended claims.

What is claimed is:

1. A combined diesel-gas turbine system, the system comprising:
    a diesel engine;
    a catalytic sub-system in communication with an exhaust port of the diesel engine, the catalytic sub-system operative for combusting all unburned exhaust pollutants, and reducing NOx, the catalytic sub-system increases the internal energy of the exhaust gases;
    a gas-turbine sub-system for delivering excess energy to a storage system; and
    a hybrid electric sub-system for the management of energy generated by the storage system;
    wherein the combined diesel-gas turbine system operates at steady conditions close to stoichiometric conditions; and
    wherein the catalytic sub-system includes a first catalytic converter and a second catalytic converter, the first catalytic converter operative to burn HC, CO, VOC and $H_2$ and reduce NOx in the exhaust until oxygen in the exhaust is depleted, the second catalytic converter operative to destroy all remaining HC, CO and VOC with the assistance of air injected after the first catalytic converter and before the second catalytic converter.

2. The combined diesel gas-turbine system of claim 1, in combination with mobile diesel engine application.

3. The system of claim 1, further comprising a steam generator to further increase the thermal efficiency of the system.

4. The system of claim 1, wherein the first and second catalytic converters are in series.

5. The system of claim 1, wherein the first and second catalytic converters are ahead of the turbo-charger.

6. The system of claim 1, wherein the second catalytic converter is in communication with a turbine of the gas-turbine sub-system for recuperation of secondary combustion energy.

7. The system of claim 1, further including a source of injected air in communication with the catalytic sub-system after the first catalytic converter and before the second catalytic converter.

8. The system of claim 7, wherein the injected air comprises about 1% to 2% compared to the volume of exhaust exiting the engine.

9. A combined diesel gas-turbine system for optimizing operation and combustion process of a diesel engine, the diesel engine having a variable valve train system and controls to operate at steady state conditions at close to stoichiometric conditions, the combined diesel gas-turbine system comprising:
    a catalytic sub-system operative for combusting diesel exhaust pollutants, the catalytic sub-system including a first catalytic converter and a second catalytic converter, the first catalytic converter operative to burn HC, CO, VOC and $H_2$ and reduce NOx in the exhaust until oxygen in the exhaust is depleted, the second catalytic converter operative to destroy all remaining HC, CO and VOC with the assistance of air injected after the first catalytic converter and before the second catalytic converter;

a turbo-charger sub-system for the reclamation of secondary energy, the turbo-charger sub-system including a turbine in communication with the second catalytic converter for receiving a source of cleaned exhaust gas to drive the turbine; and a hybrid sub-system for the management of energy within the system, the hybrid sub-system mechanically coupled to the diesel engine for receiving mechanical power from the diesel engine and electrically coupled to the turbo-charger sub-system through a motor/generator.

10. The system of claim 9, wherein the diesel engine includes an even number of cylinders and maintains steady exhaust temperatures during operation.

11. The system of claim 9, wherein the catalytic sub-system is capable of reducing all exhaust pollutants to near-zero level and increase the internal energy in the exhaust gases.

12. A method for optimizing the operating and combustion processes of a diesel engine with a turbo-charger with a combined diesel gas-turbine system, the method including:

combusting exhaust gas from the diesel engine with a three-way catalytic sub-system including a first catalytic converter in series with a second catalytic converter, including:

combusting the exhaust gas with the first catalytic converter to burn HC, CO, VOC and $H_2$ and reduce NOx in the exhaust until oxygen in the exhaust is depleted;

injecting air into the three-way catalytic converter after the first catalytic converter and before the second catalytic converter; and further combusting the exhaust gas with the second catalytic converter to destroy all remaining HC, CO and VOC with the assistance of the air injected after the first catalytic converter and before the second catalytic converter;

routing at least a portion of a cleaned exhaust gas from the catalytic sub-system to a turbine of a turbo-charger to thereby reclaim a source of secondary energy;

delivering a source of turbo-charged air from the turbo-charger to an intake of the diesel engine; and managing energy within the system with a hybrid sub-system, the hybrid sub-system including the hybrid sub-system mechanically coupled to the diesel engine for receiving mechanical power from the diesel engine and electrically coupled to the turbo-charger sub-system through a motor/generator.

* * * * *